(12) United States Patent
Losi

(10) Patent No.: US 9,849,974 B2
(45) Date of Patent: Dec. 26, 2017

(54) IMPACT ABSORBER DEVICE, PARTICULARLY FOR AIRCRAFT

(71) Applicant: SIA AEROSPACE S.R.L., Milan (IT)

(72) Inventor: Joyce Adriano Losi, Milan (IT)

(73) Assignee: SIA AEROSPACE S.R.L., Milan (IT)

( * ) Notice: Subject to any disclaimer, the term of this patent is extended or adjusted under 35 U.S.C. 154(b) by 30 days.

(21) Appl. No.: 14/783,887

(22) PCT Filed: Apr. 11, 2014

(86) PCT No.: PCT/EP2014/057358
§ 371 (c)(1),
(2) Date: Oct. 12, 2015

(87) PCT Pub. No.: WO2014/167087
PCT Pub. Date: Oct. 16, 2014

(65) Prior Publication Data
US 2016/0052625 A1    Feb. 25, 2016

(30) Foreign Application Priority Data

Apr. 12, 2013  (IT) .............................. MI2013A0604

(51) Int. Cl.
| B64C 25/58 | (2006.01) |
| F16F 7/12 | (2006.01) |
| B64C 25/52 | (2006.01) |
| B64C 25/64 | (2006.01) |
| B64C 25/32 | (2006.01) |

(52) U.S. Cl.
CPC .............. *B64C 25/58* (2013.01); *B64C 25/52* (2013.01); *B64C 25/64* (2013.01); *F16F 7/121* (2013.01); *F16F 7/122* (2013.01); *B64C 2025/325* (2013.01)

(58) Field of Classification Search
CPC .......... B64C 25/58; B64C 25/64; B64C 25/52
See application file for complete search history.

(56) References Cited

U.S. PATENT DOCUMENTS 3,466,733 A * 9/1969 Barsam .................. B64C 25/64
29/896.93

FOREIGN PATENT DOCUMENTS

| DE | 11 04 833 | 4/1961 | |
| DE | 1104833 B * | 4/1961 | ............. B64C 25/52 |
| WO | WO 2010/141628 | 12/2010 | |

OTHER PUBLICATIONS

International Search Report for PCT/EP2014/057358 dated May 9, 2014, two pages.

* cited by examiner

*Primary Examiner* — Justin M Benedik
(74) *Attorney, Agent, or Firm* — Nixon & Vanderhye P.C.

(57) ABSTRACT

An impact absorber device (10) of a fixed landing skid of an aircraft (1) is described. The device comprises a female element (20), a male element (30) and a core (40) arranged between said female element and said male element, wherein said female element comprises a cavity and said male element comprises a support and pressure surface for supporting said core, wherein said core comprises a body with controlled plastic deformation of a metallic material. In embodiments of the invention, the core comprises an extruded body having a honeycomb structure or a body comprising a spirally wound metallic substrate.

18 Claims, 12 Drawing Sheets

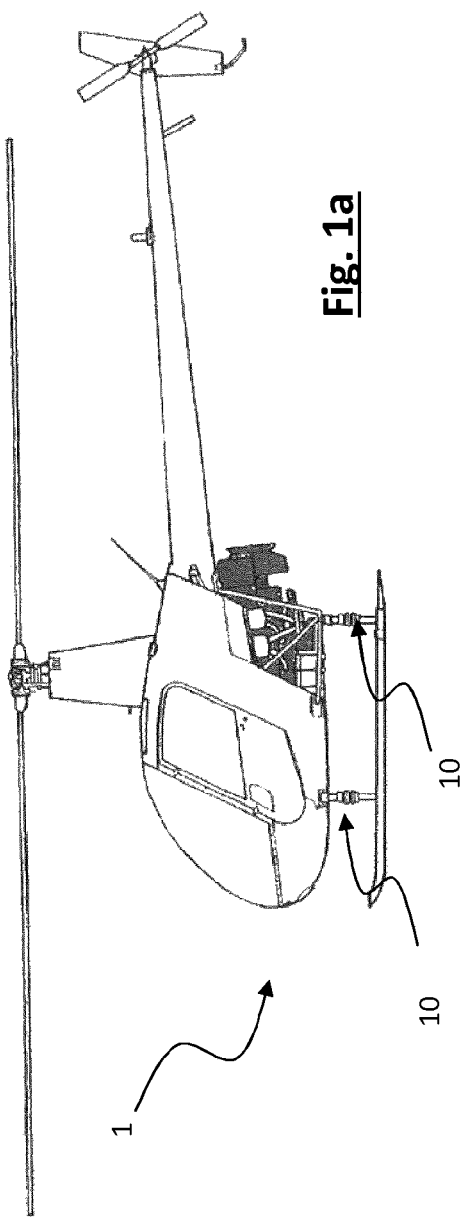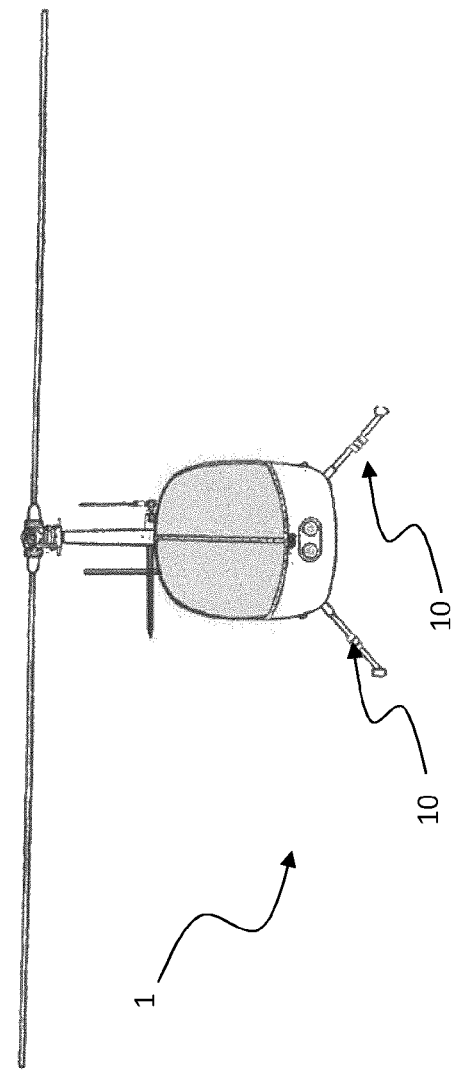

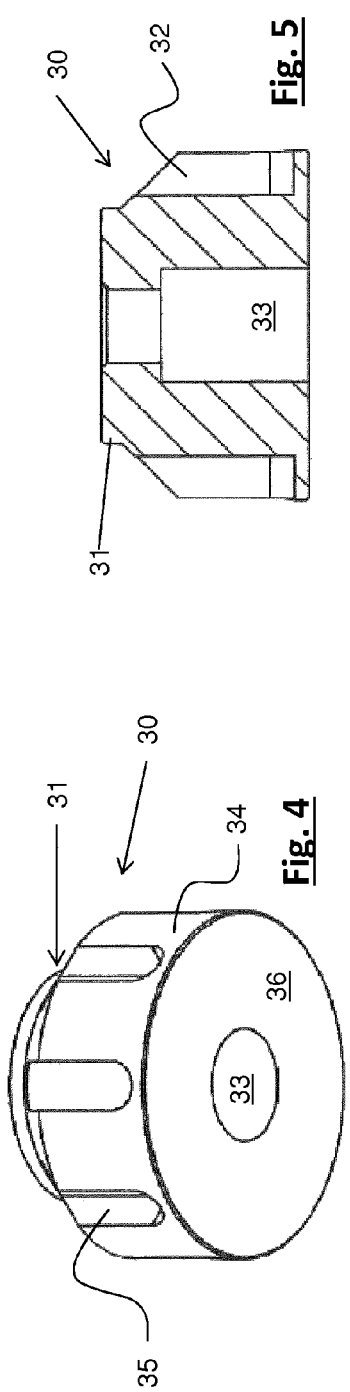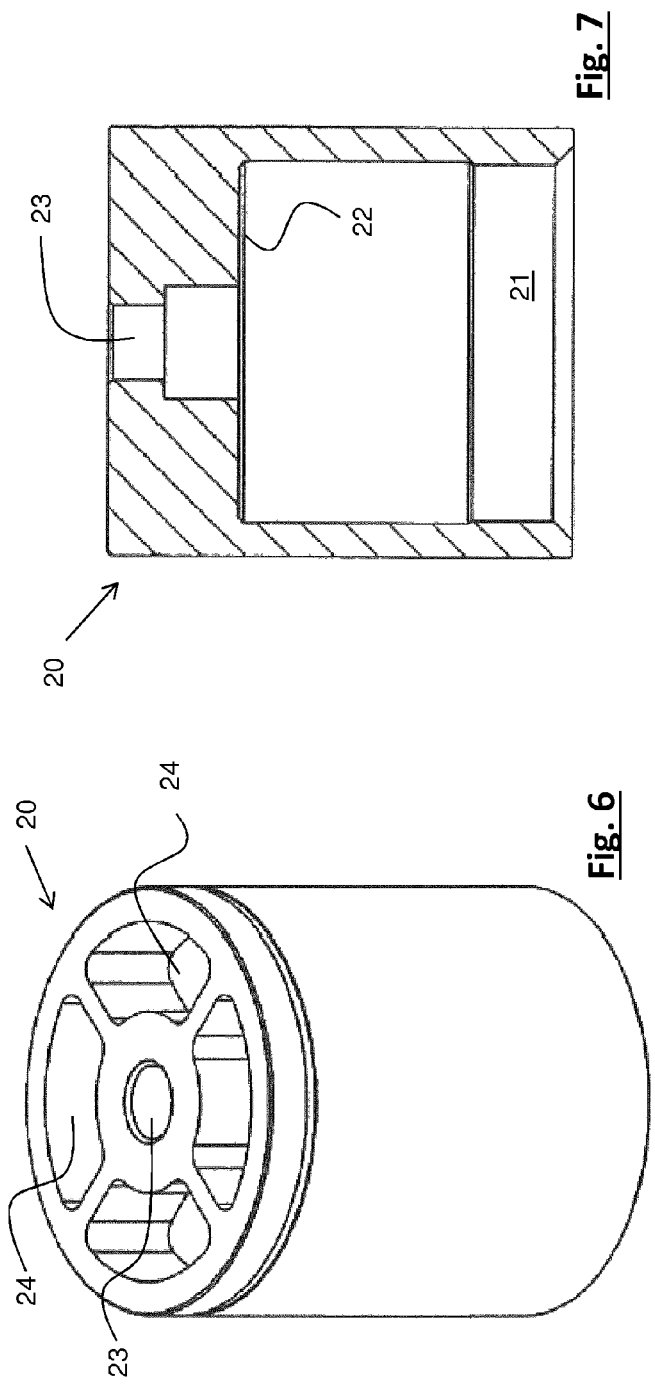

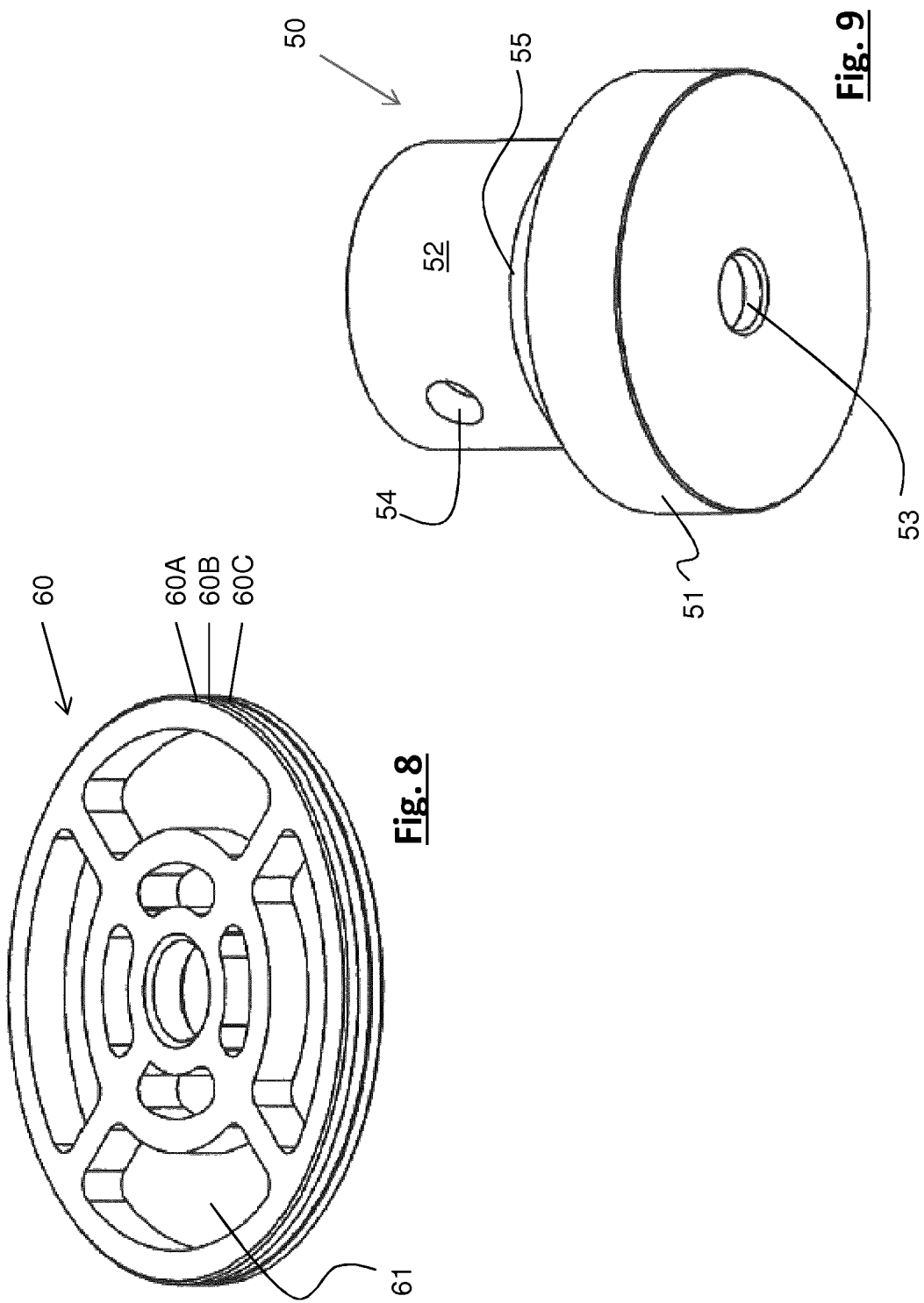

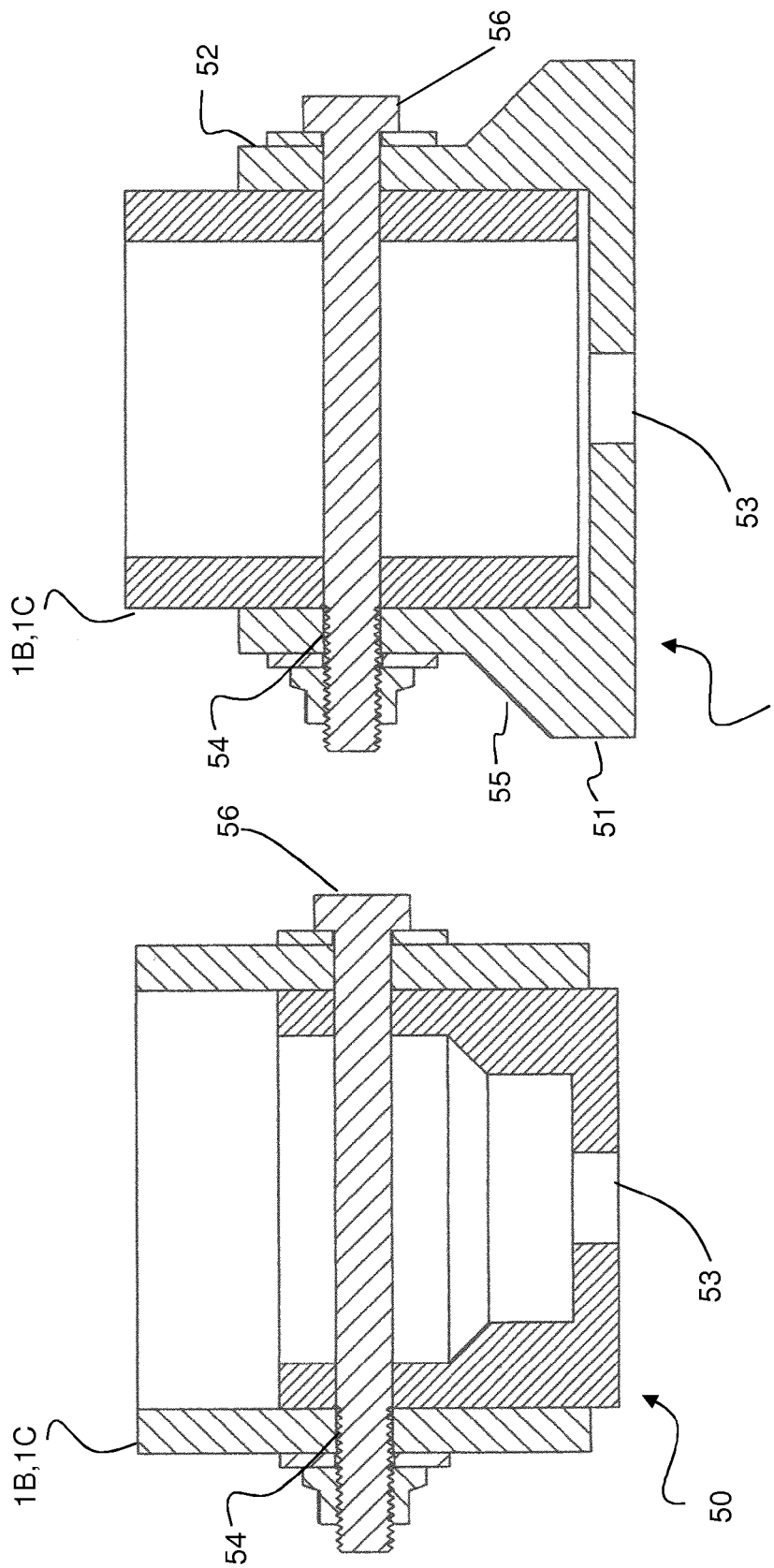

IMPACT ABSORBER DEVICE, PARTICULARLY FOR AIRCRAFT

This application is the U.S. national phase of International Application No. PCT/EP2014/057358 filed 11 Apr. 2014 which designated the U.S. and claims priority to IT MI2013A 000604 filed 12 Apr. 2013, the entire contents of each of which are hereby incorporated by reference.

The present invention relates to impact absorption systems, in particular in the aeronautical and aerospace sector. More particularly it relates to a device for absorbing at least a part of the kinetic impact energy of an aircraft. The device according to the present invention is applicable to fixed-wing or rotary-wing vertical take-off aircraft with a fixed landing gear skid. The device according to the present invention may also be applied to small-size, fixed-wing, tourist aircraft with a fixed undercarriage mounted on wheels or skids. The device according to the present invention may also be applied to other landing components, for example to the pontoons of seaplanes or helicopters for performing operations in the open sea.

In the description below and in claims, the term "fixed landing gear skid" (or also only "skid" or "fixed skid") will be used to indicate a skid of a rotary-wing or fixed-wing vertical take-off aircraft, a fixed undercarriage (which may also be mounted on wheels) of a small-size, fixed-wing, tourist aircraft, or another landing component, for example pontoons of seaplanes or helicopters for performing operations in the open sea.

Various systems for reducing the consequences of an impact between an aircraft and obstacle, for example the ground, are known. These safety systems may be divided, depending on their modes of activation and use, into active systems and passive systems.

The active systems comprise all the devices designed to avoid, as far as possible, situations which may endanger the life of passengers and the crew. The active systems include fire detection and suppression systems, emergency oxygen supply systems and all the alarm systems which signal defective operation of the aircraft. The passive systems comprise all those devices used to limit the damage which may arise following an accident during a flight. The passive systems include the systems for extinguishing any fires which might break out after an impact or for preventing the explosion of fuel tanks.

The object of the present invention is to provide an impact absorber device for the passive safety of an aircraft, which may be incorporated in a minimally invasive manner in the existing structures, both during construction of a new aircraft and during adaptation of an aircraft.

At present two main passive safety systems for reducing the effects of an impact between a fixed landing skid of an aircraft and the ground are known.

The first known system comprises one or more inflatable cushions of the airbag type positioned on the outside of the aircraft, on the bottom thereof. This system is currently seldom used in the civil and military aeronautical industry because its contribution in terms of energy absorption is somewhat limited and it in any case causes huge damage to the aircraft structure. In particular, the tail of a rotary-wing aircraft is completely destroyed in the event of impact with the ground. Moreover, the use of this known system is approved and recommended only for landings at sea or on water. In fact, the airbag would be subject to puncturing if it came into contact with the roughness present on the ground.

The second known system envisages the use of a crash-box which is made of plastic or the like and is fixed to the bottom of the aircraft. The problem of this system is that the crash-box is very bulky, is difficult to design in terms of dimensions and is difficult to control during a violent impact.

WO2010/141628 (WO '628) discloses a damper for a landing gear of a helicopter having a barrel, a piston defining a first hydraulic cavity between the piston and a bottom end of the barrel and a second hydraulic cavity between the piston and a top of the barrel, a stack of disc springs disposed within the first hydraulic cavity in a compressed state between the bottom end of the barrel and the piston. Each of the disc springs having a substantially concave side and an opposing substantially convex side, the disc springs stacked in an alternating pattern such that any two adjacent washers have their like sides positioned adjacent to each other. The damper is secured to a skid by a bottom bushing and is further secured to the helicopter via a top bushing.

Disadvantageously, the damper of WO '628 is arranged outside of the skid legs. This in turn modifies, with very negative consequences, the aerodynamic resistance of the aircraft with a consequent reduction in the flying performance and increase in fuel consumption.

Moreover, the damper of WO '628 is designed only for use under compression and does not have a significant tensile strength caused by anchoring accessories to the landing gear.

The object of the present invention is to provide a device for absorbing at least a part of the kinetic impact energy between a fixed landing skid of an aircraft and the ground, which solves the problems of the known solutions.

According to a first aspect, the present invention provides an impact absorber device of a fixed landing skid of an aircraft. The device comprises a female element, a male element and a core arranged between said female element and said male element, wherein said female element comprises a cavity and said male element comprises a support and pressure surface for supporting said core, wherein said core comprises a body of a metallic material with controlled plastic deformation and with no elastic return and no rebound, wherein said device comprises:

- a first adapter connected to said male element for connecting the device to a first tubular section of said fixed landing skid and
- a second adapter connected to said female element for connecting the device to a second tubular section of said fixed landing skid.

The core may for example comprise an extruded body having a honeycomb structure or a body comprising a spirally wound metallic substrate.

The substrate may comprise a corrugated lamina and a flat lamina joined together.

The core may, advantageously, be at least partially made of aluminium or an aluminium alloy.

The core may be anodized and/or sandblasted and/or polished.

The core may be connected to the male element and/or to the female element by means of adhesive. In addition or instead of the connection by means of adhesive, the core may be connected to the male element by means of a threaded element and may be connected to the female element by means of a further threaded element. Alternatively, a non-threaded rod passing inside the core could be used.

In embodiments of the invention, the device may also comprise at least one adapter connected to the male element or to the female element. The adapter is designed for connection to a tubular structure which connects the landing skid to the aircraft.

According to another aspect, the invention provides an aircraft comprising a device as described above.

The present invention will become clearer from the following description, provided by way of a non-limiting example, to be read with reference to the accompanying drawings, in which:

FIGS. 1a, 1b and 1c are simplified views of aircraft with a fixed landing skid incorporating the device according to the invention;

FIGS. 4 and 5 show a male element of the device according to FIG. 2;

FIGS. 6 and 7 show a female element of the device according to FIG. 2;

FIG. 8 is an axonometric view of a spacer element of the device according to FIG. 2;

FIG. 9 is an axonometric view of an adapter of the device according to FIG. 2;

FIGS. 10 and 11 show, in cross-section, two variants of the adapter of the device according to FIG. 2;

Figure 1C:
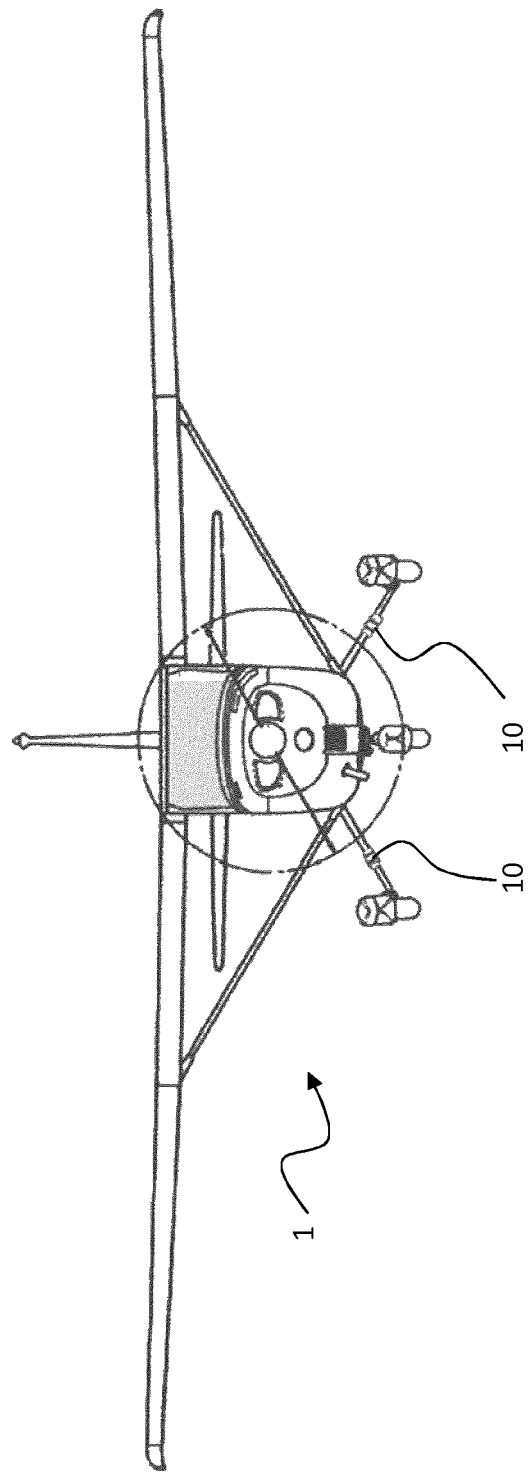

FIGS. 1a and 1b show an aircraft 1 with fixed landing skids incorporating the device 10 according to the present invention. The device 10 according to the present invention may be applied to rotary-wing or fixed-wing vertical take-off aircraft, including helicopters, gyrodynes or flying platforms, which have the fixed landing skid. The device 10 according to the present invention, as shown in FIG. 1c, may also be applied to small tourism aircraft with a fixed undercarriage mounted on wheels or skids or with fixed structures supporting pontoons or the like.

Figure 2:
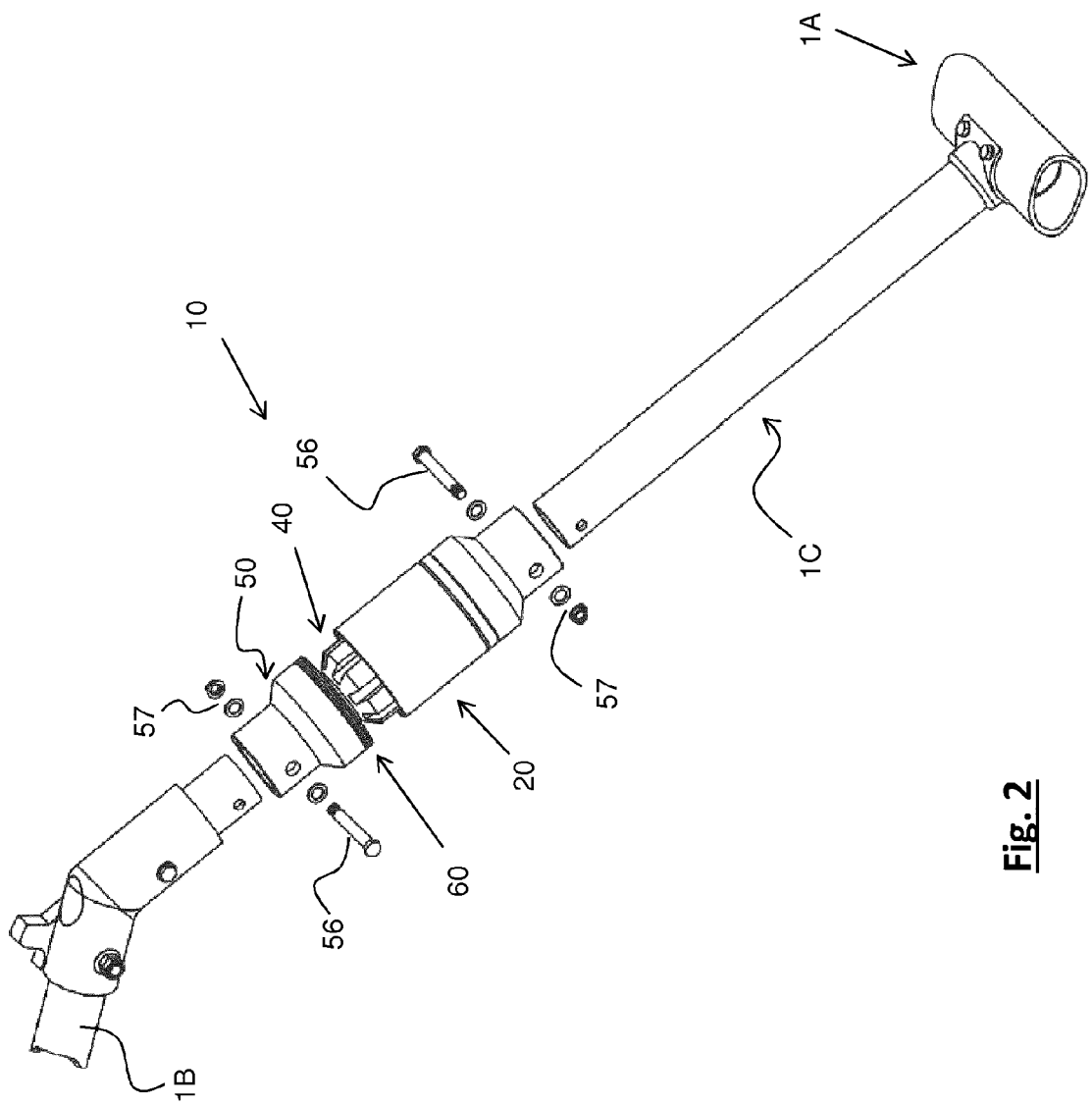
FIG. 2 is a partially exploded, axonometric view of a first embodiment of an impact absorber device according to the present invention.
Figure 3:
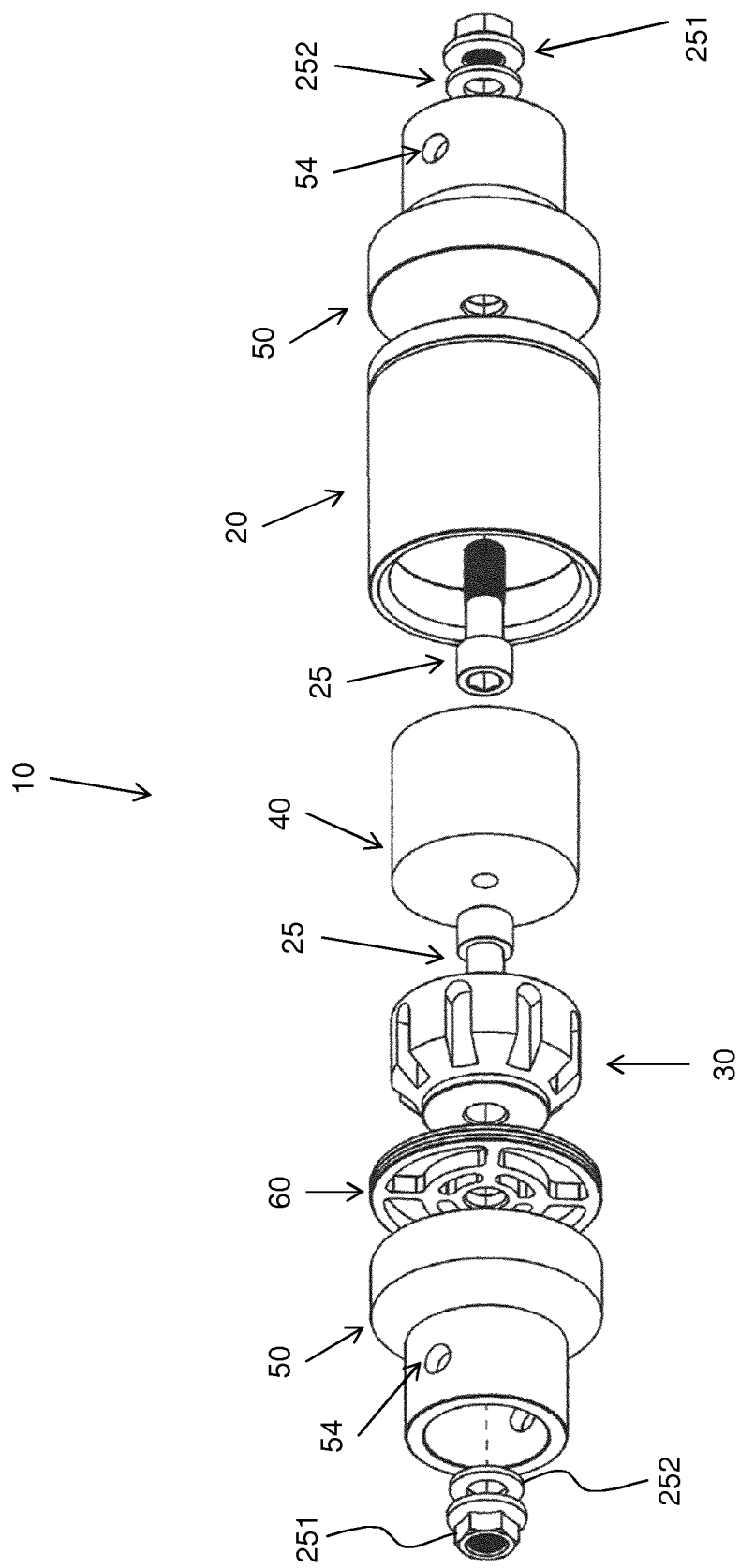
FIG. 3 is a partially exploded axonometric view of the device according to FIG. 2.

FIG. 2 shows a partially exploded view of the device 10 according to a first embodiment of the invention. The figure also shows a portion of the skid 1A and portions 1B and 1C of the tubular structure which connects the skid 1A to the rest of the aircraft 10. With reference to FIGS. 2 and 3, the device 10 comprises a female component 20, a male component 30 and a core 40. In preferred embodiments, the device 10 also comprises two adapters 50. It may also comprise a protection bellows 70 and fixing clips 71 for fastening the ends of the protection bellows 70.

The female component 20 according to the first embodiment is also shown in FIGS. 6 and 7. Preferably, the female component has the form substantially of a hollow cylinder with a circular cross-section having an open end 21 and a closed bottom 22. The closed bottom comprises a central through-hole 23. The closed bottom could also comprise openings 24 (for example formed by means of milling) in order to reduce the weight of the component.

As shown in FIG. 3, the through-hole 23 is suitable for receiving and retaining a threaded element 25 such as a hexagonal socket head screw. The threaded element 25 is designed to fix the female component to an adapter 50 which will be described more fully in the present description below. Advantageously, the threaded element is locked by means of a nut and washer 251, 252 (FIG. 3).

Preferably, the female component 20 consists of a single piece of a metallic material such as steel, stainless steel, aluminium, aluminium alloy, titanium, titanium alloy or the like. For example the aluminium alloy 6082 may be used. This alloy has excellent malleability characteristics during machining, hardness, structural strength and corrosion resistance. As an alternative to the aluminium alloy 6082, the aluminium alloy 7075, aluminium alloy 5053 or a structural steel may be used. The steel and the titanium increase the weight of the device, but provide a greater stress resistance. In other embodiments, the female component 20 is manufactured from a composite material.

In one embodiment, the internal diameter of the female component 20 is about 135 mm and the external diameter is about 145 mm. The length (from the closed bottom 22 to the open end 21) of the internal surface 25 of the female component 20 is about 170 mm.

The male component 30 according to the first embodiment is also shown in FIGS. 4 and 5. The male component 30 according to the first embodiment comprises a mushroom-shaped body with a circular cross-section having a shank 31 and a cap 32 with a diameter larger than the diameter of the shank 31.

The male component consists preferably of a solid body made of a metallic material such as steel, stainless steel, aluminium, aluminium alloy, titanium, titanium alloy or the like. For example the aluminium alloy 6082 may be used. This alloy has excellent malleability characteristics during machining, hardness, structural strength and corrosion resistance. As an alternative to the aluminium alloy 6082, the aluminium alloy 7075, aluminium alloy 5053 or a structural steel may be used. The steel and the titanium increase the weight of the device, but provide a greater stress resistance. In other embodiments, the male component 30 is manufactured from a composite material so that the whole weight becomes reduced.

The male component 30 preferably comprises a central through-hole 33 with a larger diameter along a certain section and a smaller diameter over the rest of its length. The outer surface 34 of the male component 30 according to the first embodiment may comprise weight-reducing milled zones 35.

The through-hole 33 is suitable, in a manner similar to the through-hole 23 in the female component 20, for receiving and retaining a threaded element 25 such as a hexagonal socket head screw. The threaded element 25 is designed to fix the male component to an adapter 50 which will be described more fully in the present description below. Advantageously, the threaded element 25 is locked by means of a nut and washer 251, 252 (FIG. 3).

According to the first embodiment, a spacer 60, shown in FIG. 3 and in FIG. 8, may be arranged between the male component 30 and the adapter 50. The spacer 60 may be in the form of a thick disc, preferably with one or more radial grooves 60A, 60B, 60C on its outer surface. The grooves are advantageously provided for retaining a sealant and favouring crystallization thereof. In turn, the sealant is intended to seal a protection bellows 70 which will also be mentioned below. The spacer 60 may have a solid surface or may, more preferably, have a series of openings 61 formed by means of milling, casting or some other process. Preferably, the spacer 60 comprises a central through-hole 63 allowing the threaded element 25 to pass through it.

The spacer 60 may be bonded to the adaptor 50 by means of a layer of adhesive or may be left free.

As shown in FIGS. 2 and 3, the device 10 according to the first embodiment preferably comprises two adapters 50, i.e. a top adapter and a bottom adapter. Preferably, the top adapter and the bottom adapter are formed in the same manner and therefore only one adapter 50 will be described with reference to FIGS. 9, 10 and 11.

Preferably, the adapter 50 comprises a solid body of cylindrical shape with a first larger-diameter section 51 and a second smaller-diameter section 52. A transition section 55 is provided between the two sections 51 and 52. Preferably, a central through-hole 53 which crosses both the larger-diameter section and the smaller-diameter section is provided.

Preferably, the adapter 50 also comprises a transverse through-hole 54 which extends along a diameter of the section 52. The hole 54 is suitable for receiving a locking pin 56 shown in FIG. 2. The pin 56 may be a threaded member locked by means of a nut and counter-nut 57.

The adapter 50 may be made of the same material as the female component and/or the male component.

FIG. 10 shows a cross-section of a first embodiment of an adapter 50 according to the present invention. The adapter according to the first embodiment is designed to be fitted inside a tubular section 1A or 1B of a skid of an aircraft (helicopter or the like). FIG. 10 also shows threaded hole 54 suitable for receiving a locking pin 56 which is threaded at its end.

FIG. 11 shows a cross-section of a second embodiment of an adapter 50 according to the present invention. The adapter according to the second embodiment is designed to be fitted outside a tubular section 1A or 1B of a skid of a helicopter or the like. Similarly to the adapter of FIG. 10, FIG. 11 shows threaded hole 54 suitable for receiving a locking pin 56 which is threaded at its end.

The core 40 is arranged between the female component 20 and the male component 30. Preferably, the core 40 has a shape which is roughly cylindrical with a circular cross-section.

Preferably, the core 40 is connected to the surface 36 (FIG. 4) of the male component 30, for example by means of bonding. Advantageously, a structural adhesive for metals, typically a dual-component epoxy resin, may be used. As an alternative to bonding, the connection between core and male component may also be performed by means of braze-welding or other similar techniques.

In any case, preferably, a direct mechanical connection between the female component 20 and the male component 30 is not envisaged since they may be free to slide inside each other.

Figure 12:
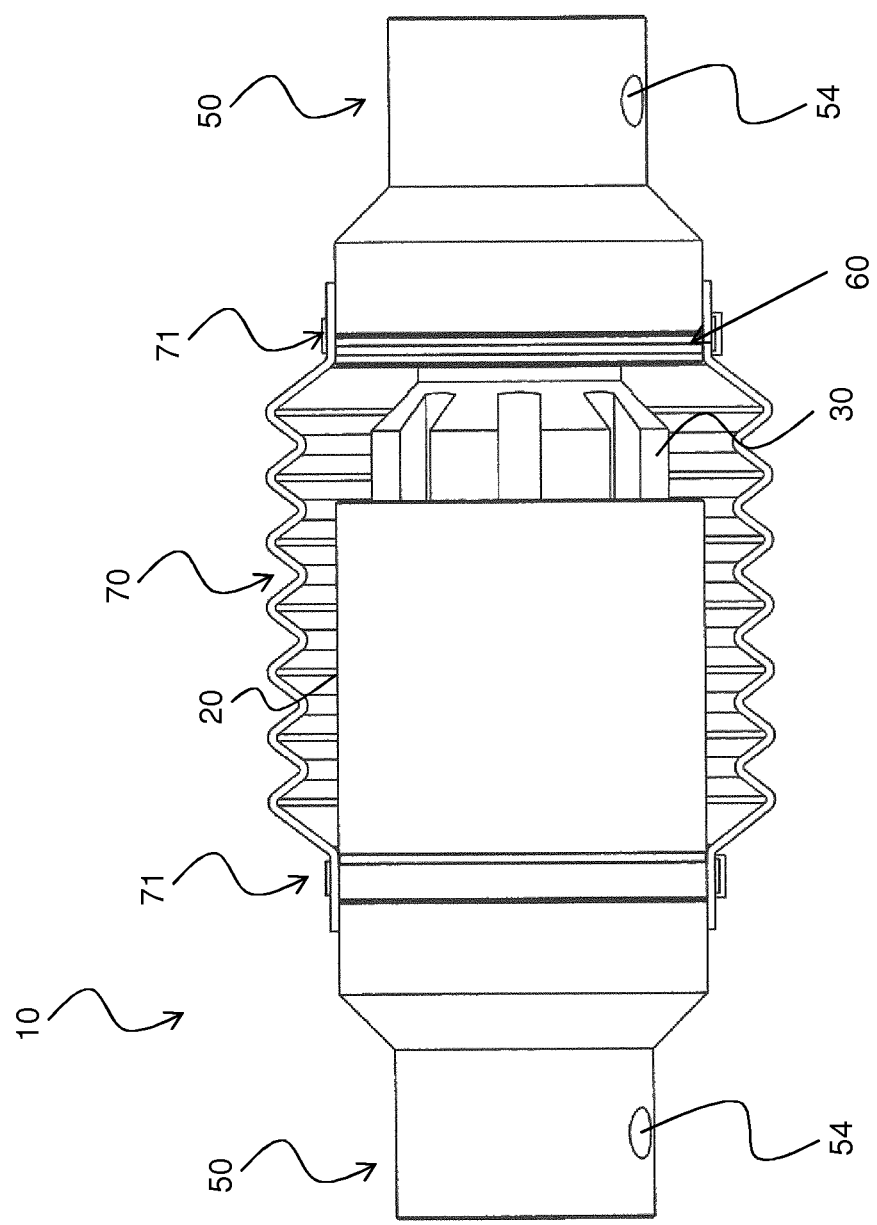
FIG. 12 is a partially sectioned view of an impact absorber device according to the present invention with protective bellows mounted.

In order to allow this sliding movement, the cylindrical inner surface of the female component and/or the outer surface of the male component may be kept moistened by means of an oily or synthetic lubricant. Preferably, this lubricant is retained by means of a bellows made of rubber or a similar elastic and deformable material. This bellows 70 is shown only in FIG. 12. It is instead not shown in the other figures, so as not to hinder viewing of the other components of the device. The bellows 70 may be fixed by means of—for example metallic—clamping clips 71 or the like. The lubricant is provided for avoiding blocking of sliding components but it gives no substantial contribution to damping.

Preferably, the core 40 according to the present invention is an extruded solid with a substantially cylindrical geometry having an internal honeycomb structure (FIG. 13c) which may be made of different materials and metal alloys. By modifying the diameter, the thickness of the inner laminae, the density of the cells and/or other physical or geometrical characteristics it is possible to obtain an extremely large number of combinations which directly affect the weight, structural strength and impact energy absorption capacity. Advantageously, all these properties may be expressed by means of well-defined physical/mathematical laws (with a small degree of approximation) for predicting with great accuracy all the responses of the component when subject to particular types of forces or impacts; it is thus possible to carry out a specific study for each area of use and ensure the application of the most suitable and practical solutions. In one embodiment, the cells are hexagonal cells with a side size of 4-6 mm, for example about 5 mm.

In embodiments of the invention (FIGS. 13a and 13b), the core 40 is formed by spirally (or helically) winding around a mandrel a metallic substrate comprising a corrugated lamina 41 and a flat lamina 42 which are joined together. In other embodiments, the core 40 is formed by helically winding around a mandrel a metallic substrate formed by a corrugated lamina sandwiched between two flat laminae connected together. The lamina 41, 42 may have a thickness of about 0.20 mm. The thickness of the substrate may be about 5.0 mm.

Figure 13B:
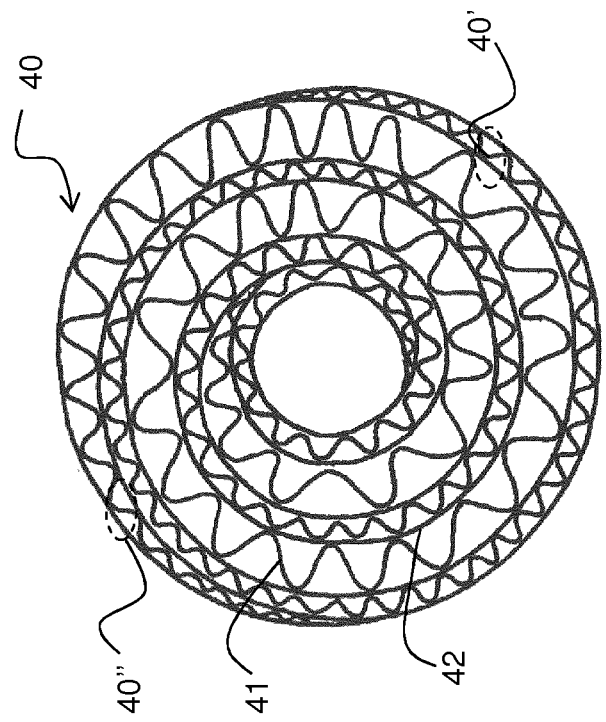
FIGS. 13a, 13b, 13c, 13d and 13e are schematic cross-sections of cores according to the present invention.
Figure 13A:
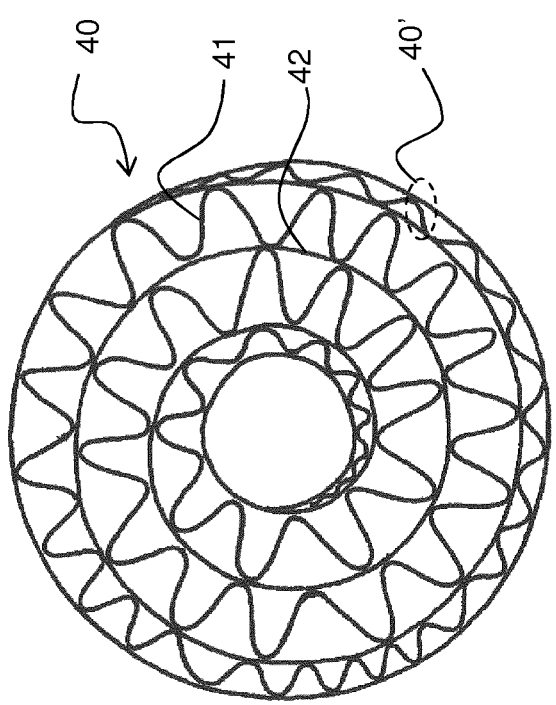

In particular, FIG. 13a shows an energy absorption core with a single spiral (40'). FIG. 13b instead shows an energy absorption core with a double spiral (40', 40").

Figure 13D:
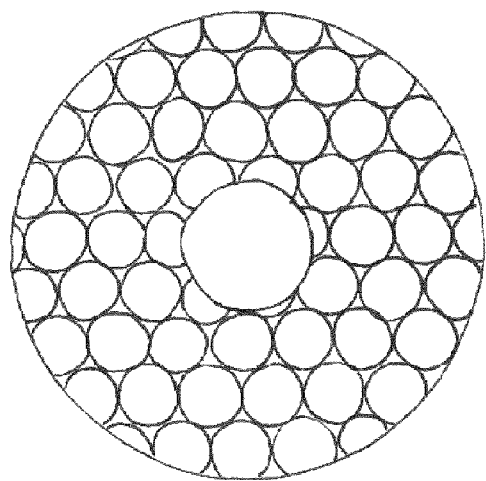
Figure 13C:
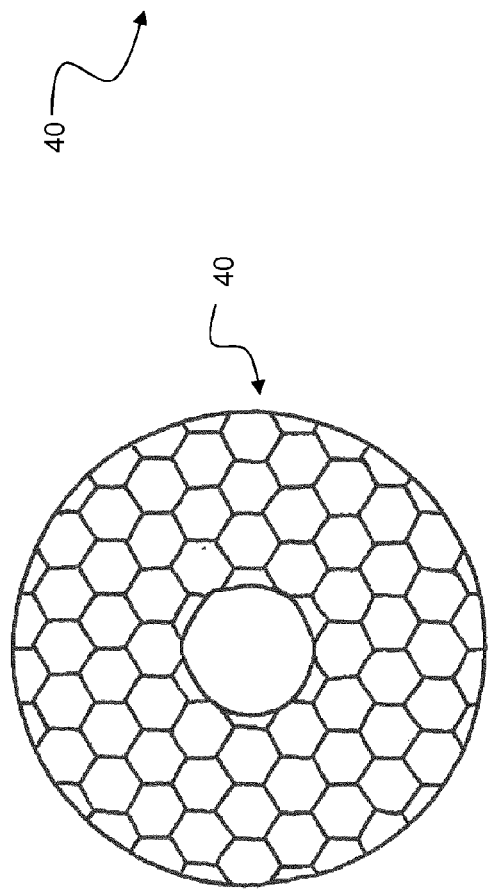
Figure 13E:
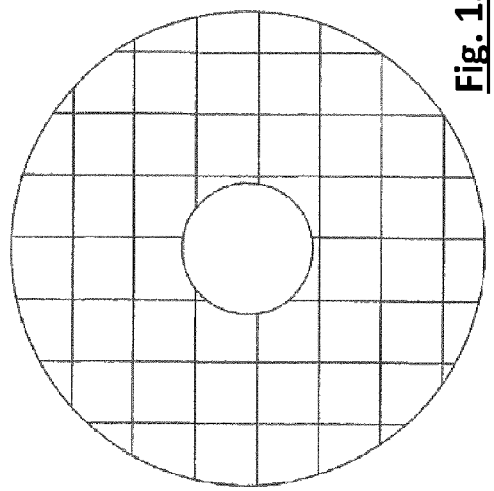

FIGS. 13c, 13d and 13e show other possible cross-sections of the energy absorption core. The core 40 may be formed as a honeycomb with substantially hexagonal cells (FIG. 13c), with substantially circular cells (FIG. 13d) or with substantially square cells (FIG. 13e). The shape affects density of the core.

In embodiments of the invention, the core 40 could be partially filled with a polyurethane foam (which autonomously changes its physical state). In other words, at least some of the honeycomb cavities of the core are filled with polyurethane foam. Preferably, all the honeycomb cavities of the core are filled over a length equal to at least one ⅕th of the height of the core. More preferably, all the honeycomb cavities of the core are filled over a length equal to about ¼ of the height of the core. The lamina may have a thickness of about 0.20 mm. The thickness of the substrate may be about 5.0 mm.

Preferably the core 40 is connected to the male component 30 and/or to the female component 20 by means of bonding.

In embodiments of the invention, the core 40 is subjected to an anodization treatment. Preferably, the anodization treatment is carried out on the whole of the core. The anodization treatment involves an increase in the porosity of the material so as to obtain more robust and durable bonding.

In embodiments of the invention, the core 40 is subjected to a sandblasting treatment in order to render the surface more porous. The sandblasting treatment causes an increase in the porosity of the material so as to obtain more robust and durable bonding. Advantageously similar sandblasting treatment may be also carried out on the male component and/or on the female component.

In embodiments of the invention, the surfaces of the core are subjected to a polishing treatment, in this case also with the aim of obtaining better bonding results.

In one embodiment of the invention, the core has an outer diameter of between about 70 mm and 90 mm, preferably about 80 mm, and a height of between about 55 mm and about 75 mm, preferably of about 65 mm.

Preferably, the density of the core is about 0.60306 g/cm$^3$±10%. Preferably, the density of the core varies depending on the external dimensions of the core itself and depending on the diameter of the inner hole.

During use of the device and in the event of a violent impact (for example with the ground) the male component 30 acts as a piston, accumulating the energy of the impact and transferring it to the core 40, causing deformation thereof and resulting in both elements (core and male component) filling and occupying the hollow space of the female component 20.

In embodiments of the present invention, a containing collar is also provided for reinforcing the radial strength of the female component 20 in the event of an impact and therefore in case there is a compression (and therefore radial expansion) of the core 40. The containing collar may be formed by a plurality of rings made of metallic material and immersed in an epoxy matrix and laminated with double twill carbon skins with an intra-level orientation of 45°.

Figure 14:
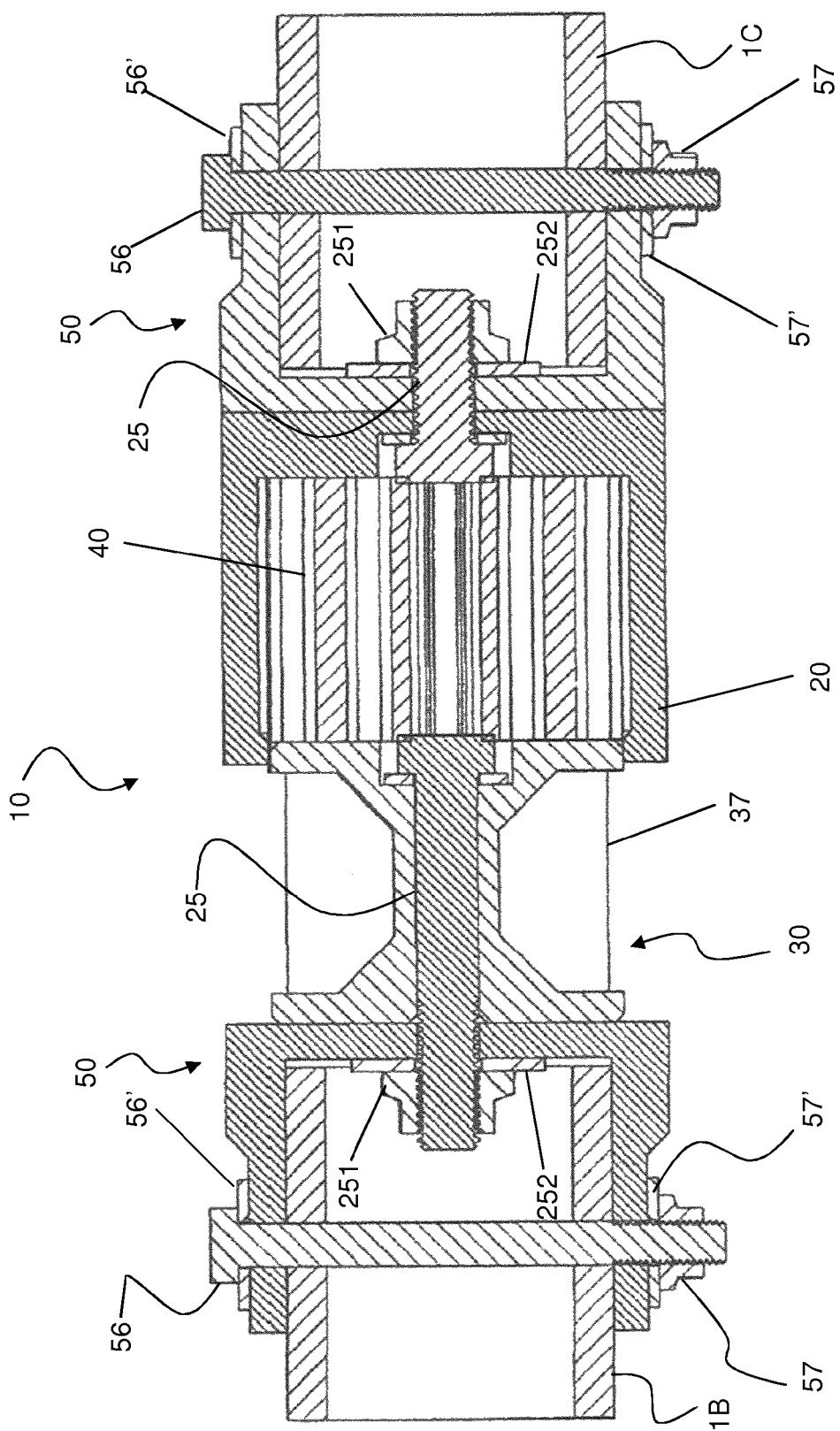
FIG. 14 is a longitudinally sectioned view of a second embodiment of an impact absorber device according to the present invention.
Figure 15:
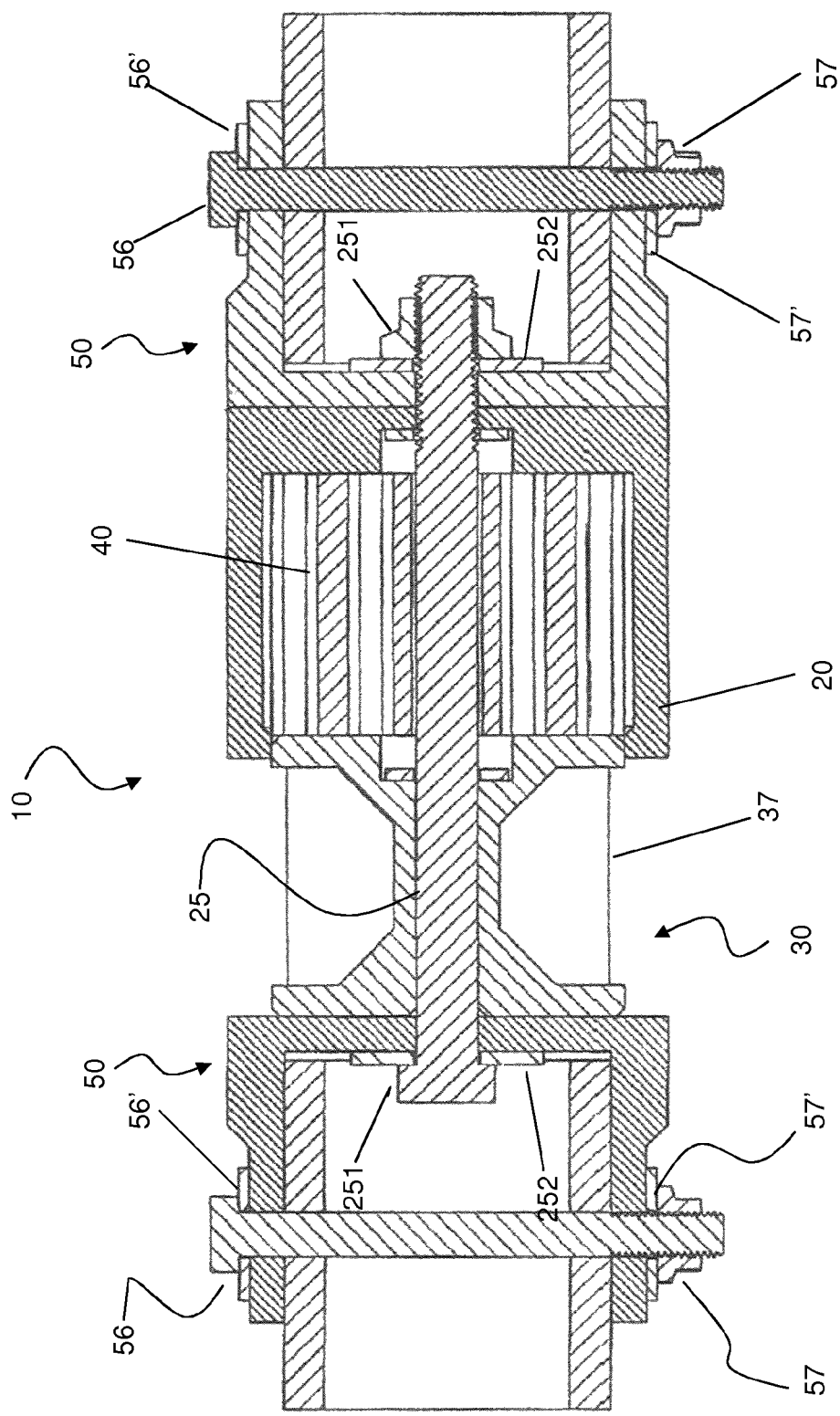
FIG. 15 is a longitudinally sectioned view of a third embodiment of an impact absorber device according to the present invention.

FIGS. 14 and 15 show two further embodiments of the present invention. The same reference numbers have been used to distinguish the same parts or parts which are functionally equivalent.

According to the embodiment of FIG. 14, a double internally threaded connection is provided. In other words, the impact absorber device uses two different threaded connections. The first threaded connection 25' for connecting an adapter 50 to the male component 30. The second threaded connection 25" for connecting the female component 20 to the other opposite adapter 50. In this embodiment it is possible to avoid the use of the spacer 60. The male component 30 may be fastened to the core by means of bonding with an adhesive of the type mentioned above.

FIG. 14 also shows the two tubular portions 1B and 10 of the tubular structure which connects the skid 1A to the remainder of the aircraft 10. According to the present invention and differently from other known solutions, the device is connected directly to the tubular support structure of the landing skids, is able to withstand also high tensile forces and has a negligible impact on the weight of the aircraft and its aerodynamic resistance during forward movement.

According to the embodiment of FIG. 15, a single, internal, threaded connection 25 between the two adapters 50 is provided. In this embodiment also it is possible to avoid using the spacer 60. The male component 30 may be fastened to the core by means of bonding using an adhesive of the type mentioned above.

According to the embodiments shown in FIGS. 14 and 15, the male component 30 may be formed with a shaped central part which has a central hole and reinforcing flanges 37. These reinforcing flanges are preferably four or more in number and may be fastened to the central part by means of a structural adhesive of the type mentioned above.

The device according to the present invention may be applied to rotary-wing or fixed-wing vertical take-off aircraft, including helicopters, gyrodynes and flying platforms, which have the fixed landing skid. The device according to the present invention may also be applied to small tourist aircraft with a fixed undercarriage mounted on wheels or skids, or to all the other machines indicated above.

It is intended to be used to absorb the kinetic energy which must be absorbed during a collision with the ground or with undefined third-party objects. However, this limited field of initial study does not exclude the possibility in future of applying the device 10 according to the invention to other energy damping systems. Such use is currently provided for by the core which is modified only by means of an increase in its density and anodization of the said component so that it has a greater functional capacity in the finished product and greater absorption of the kinetic energy (the increase in absorption is small compared to the total amount it normally absorbs).

The current application is intended for all those structures which are subject to a compressive force and have a tubular structure, with a geometric cross-section formed for example by a circle, a square or a rectangle. By making use of the pre-existing fixed landing structures mounted on vertical take-off aircraft or in any case aircraft with a fixed undercarriage/skid, the aim is to dampen the energy during a collision by inserting the component in the aforementioned member so that the core of the said component gives way before deformation of the aircraft fuselage occurs.

If the fixed landing member is schematically represented generally as a cage, the device 10 according to the present invention is inserted inside the part of the structure directed towards the ground.

The device 10 according to the invention may be fitted during design and initial construction of the aircraft 1 or may be mounted subsequently by adapting the fixed landing member. In this case, in some aircraft with a "single-structure" skid, it may be necessary to cut the tubular part of the fixed landing member at a predetermined point and insert the device inside the structure (by means of the adapters, inside or outside the tubular part). The connection may be performed by means riveting/bolting, welding or bonding. Advantageously, the holes 54 of the adapter 50 may be used for bolting.

Thus, owing to the threaded holes 54 it is possible to provide three different types of joints depending on requirements, namely a welded joint, bolted joint or riveted joint or combination thereof. Bolting is very advantageous since it is very strong and simple to apply, unlike welding which requires specialized personnel and specific machinery for execution thereof, as well as spot checks after each operation. Moreover bolting or connecting by rivets has the major advantage that, in the event of an impact or total or partial crash involving the device, it will be sufficient to remove the bolts and replace the device in order to obtain immediately an aircraft which is able to resume its intended functions by means of this very simple and rapid operation. Alternatively, should a very high degree of reliability and safety be required, the use of both bolting and welding ensure a joint which is 100% reliable without any risk of it coming loose or being prone to tampering. In this case, should it be required to replace the component after impact, it will be required to eliminate the device and a small part of the skid leg before performing renewed bolting and welding of the part. This type of connection is preferred.

Following physical installation on an aircraft which is not originally fitted with the device 1 according to the invention, it might be necessary to update the flight software depending on the new load (even if the increase is minimal) and variation in the centre of gravity.

Advantageously, the device according to the present invention does not require essentially any type of maintenance after installation (apart from the usual routine checks generally carried out on all the parts of an aircraft). This is due to the fact that there are no mechanical parts which are moving or subject to any type of wear except at the moment of impact. Indeed, the lubricant, if any, should not be checked, replaced or replenished. At this point no direct operation will be carried out on the device, but simple replacement following the damage will be performed.

The present invention offers a series of advantages compared to the known solutions and in particular compared to WO '628, among which the following may be mentioned:

Tensile strength: the impact absorber device according to the invention has a tensile strength greater than that required for a landing member installed on a helicopter or the like, allowing a structural assembly which does not adversely affect the performance of an aircraft fitted with a conventional system without impact dampers. Differently, the damper according to WO '628 does not posses the same physical characteristics, being designed for compressive use only, without any substantial tensile strength.

High dissipation capacity: the impact absorber device according to the invention is based on the use of a core with controlled plastic deformation of metallic material allowing a very large amount of energy to be dissipated without problems of fragility.

No maintenance and operating errors: the impact absorber device according to the invention does not require extraordinary maintenance operations or checks, compared to the known systems with hydraulic or gas-operated parts.

Insertion inside the landing member of the helicopter: the impact absorber device according to the invention is installed as an integral part of the fixed-type landing member (as shown in FIGS. 1 and 2) and not on the outside thereof (as in the solution according to WO '628).

Less aerodynamic resistance: the impact absorber device according to the invention is inserted inside the landing member of the aircraft and does not modify the coefficient of aerodynamic resistance of the moving aircraft, thus avoiding limitation of the movement performance and increased fuel consumption. This problem is due to the increase in surface area which opposes the movement of the aircraft resulting from the use of one or more dampers outside the landing member and outside the fuselage of the helicopter.

Universally compatible system: the impact absorber device according to the invention may be installed in any landing member of the fixed type used by helicopters or other vehicles. On the other hand, the damper according to WO '628 requires modification of the internal structure of the aircraft and external structure in order to create additional attachment points. Moreover, in order to install the damper of WO '628, the aircraft must be fitted with systems for limiting the tensile load.

The invention claimed is:

1. An impact absorber device of a fixed landing skid of an aircraft,
    the device comprising
        a female element,
        a male element, and
        a core arranged between said female element and said male element, wherein said female element comprises a cavity having an open end, a closed bottom and an internal surface,
            wherein said male element comprises a support and pressure surface for supporting said core and for closing the cavity at the open end,
            wherein said core comprises a body of a metallic material with controlled plastic deformation and with no elastic return,
            wherein said core is connected to at least one of the support and presure surface and the closed bottom of the female element,
            wherein said core has a cylindrical shape with a first base in contact with the support and pressure surface and a second base in contact with the closed bottom of the female element,
        a first adapter connected to said male element for connecting the device to a first tubular section of said fixed landing skid, and
        a second adapter connected to said female element for connecting the device to a second tubular section of said fixed landing skid.

2. The device according to claim 1, wherein said core comprises a body comprising a spirally wound metallic substrate.

3. The device according to claim 2, wherein said substrate comprises a corrugated lamina and a flat lamina connected together.

4. The device according to claim 1, wherein said core comprises an extruded body having a honeycomb structure.

5. The device according to claim 1, wherein said core is at least partially comprised of aluminium or an aluminium alloy.

6. The device according to claim 1, wherein said core is anodized.

7. The device according to claim 1, wherein said core is connected to the male element by an adhesive.

8. The device according to claim 1, wherein said core is connected to the male element by a threaded element and is connected to the female element by a further threaded element.

9. The device according to claim 1, comprising a single internal threaded connection extending from said first adapter to said second adapter.

10. The The device according to claim 9, wherein said single internal threaded connection is configured to pass through a through-hole of said core.

11. The device according to claim 1, wherein said male component comprises a shaped central part with a central hole and reinforcing flanges.

12. The device according to claim 11, wherein said reinforcing flanges are fastened to the central part by an adhesive.

13. An aircraft comprising the device according to claim 1.

14. The device according to claim 1, wherein said core has a shape and size such that said core occupies the space delimited by said cavity and said support and pressure surface.

15. The device according to claim 1, wherein said core is sandblasted.

16. The device according to claim 1, wherein said core is polished.

17. The device according to claim 1, wherein said core is connected to the female element by an adhesive.

18. The device according to claim 1, wherein said core, said male element, and said female element are configured, upon the male element accumulating energy of impact of the aircraft, to deform the core whereby both the core and the male element occupy the cavity of the female element.

* * * * *